United States Patent [19]
Imamura

[11] Patent Number: 5,825,510
[45] Date of Patent: Oct. 20, 1998

[54] IMAGE SENSOR AND FACSIMILE APPARATUS INCORPORATING THE SAME

[75] Inventor: Masaya Imamura, Kyoto, Japan

[73] Assignee: Rhom Co., Ltd., Kyoto, Japan

[21] Appl. No.: 953,105

[22] Filed: Sep. 29, 1992

[30] Foreign Application Priority Data

Sep. 30, 1991 [JP] Japan ................................. 3-250038

[51] Int. Cl.$^6$ .................................................. H04N 1/40
[52] U.S. Cl. ........................................ 358/471; 250/208.1
[58] Field of Search .................................. 358/471, 474, 358/482, 483, 505, 513; 250/208.1; 348/294

[56] References Cited

U.S. PATENT DOCUMENTS

| 4,581,657 | 4/1986 | Takano | 358/483 |
| 5,280,364 | 1/1994 | Kihara et al. | 250/208.1 |

FOREIGN PATENT DOCUMENTS

| 55-74265 | 6/1980 | Japan | 358/474 |
| 236665 | 2/1990 | Japan . | |

OTHER PUBLICATIONS

*Guide for Patent Draftsmen*, U.S. Department of Commerce, Patent and Trademark Office, Revised Jan. 1989, p. 18.

Primary Examiner—Thomas D. Lee

[57] ABSTRACT

An image sensor and a facsimile apparatus incorporating the same. A sponge piece is attached to a substrate with a light receiving device attached thereto. The sponge piece is brought into contact with an inclined inner wall surface of the frame when the substrate is mounted on the frame. The sponge piece thus urges the substrate in the vertical direction and sideways, thereby fixing the substrate at a predetermined position. Since the light receiving device is prevented from any deviation in the horizontal and vertical direction, a good picture quality is obtained.

12 Claims, 6 Drawing Sheets

IMAGE SENSOR AND FACSIMILE APPARATUS INCORPORATING THE SAME

BACKGROUND OF THE INVENTION

1. Field of the Invention

The present invention relates to an image sensor used for a facsimile machine, an optical character reader, etc. and a facsimile apparatus incorporating such an image sensor.

2. Description of the Related Art

In a conventional image sensor, as shown in FIG. 1, a transparent cover (glass cover) 11 is attached to the upper portion of a frame 10, and a substrate 13 having a light emitting device 12, which is an array of light emitting elements, is fixed to the frame 10 so as to be inclined at 45 degrees relative to the surface of the glass cover 11. A cylindrical plastic lens 14 is disposed in the optical path of the light emitting device 12 along the light emitting device 12, and a rod lens array 15 as an optical system is fixed to the frame 10 perpendicularly relative to the surface of the glass cover 11. The rod lens array 15 converges the light reflected from the copy W as the object is being photographed. A substrate 16 is disposed on the bottom surface 10a of the frame 10 in parallel with the glass cover 11. A light receiving device 17 for receiving the light from the rod lens array 15 is provided on the substrate 16. An elastic member 18 is fixed to the substrate 16 such that the upper surface of the elastic member 18 comes into contact with the under surface of an upper portion of the frame 10. In this way, the elastic member 18 presses the substrate 26 against the bottom surface of the frame 10a by an elastic force.

In such an image sensor, the light emitted from the light emitting device 12 is projected onto the copy W on the glass cover 11 through the plastic lens 14 at about 45 degrees relative to the glass cover 11. The light reflected from the copy W perpendicularly to the glass cover 11 is converged on the rod lens array 15, and received and converted into an electric signal by the light receiving device 17 which is situated directly under the rod lens array 15.

In the conventional image sensor shown in FIG. 1, although the substrate 16 is held in position in the vertical direction it may not be properly registered in the horizontal direction since the substrate 16 having the light receiving device 17 is pressed only against the bottom surface of the lower portion of the frame 10 by the elastic member 18. As a result, optical path of the rod lens array 15, which leads to the deterioration of image quality.

SUMMARY OF THE INVENTION

Accordingly, it is an object of the present invention to eliminate the above-described problems of the prior art and to provide an image sensor which prevents the light receiving device from deviating from the optical path of the rod lens array and which secures a good picture quality.

To achieve this aim, in an image sensor according to the present invention, a frame is provided with an inclined inner surface. An elastic member is fixed to a substrate with a light receiving device attached thereto, and at least part of the elastic member comes into contact with the inclined inner surface of the frame so as to urge the substrate not only in the vertical direction but also sideways. Consequently, the substrate is positioned at a predetermined position with in the frame without deviating therefrom either in the vertical direction or in the horizontal direction.

If the substrate is urged upward, the upper surface of the substrate is fixed at a predetermined position, so that it is easy to adjust the focus of an optical system on the light receiving device.

The above and other objects, features and advantages of the present invention will become clear from the following description of the preferred embodiments thereof, taken in conjunction with the accompanying drawings.

DESCRIPTION OF THE PREFERRED EMBODIMENT

Figure 1:
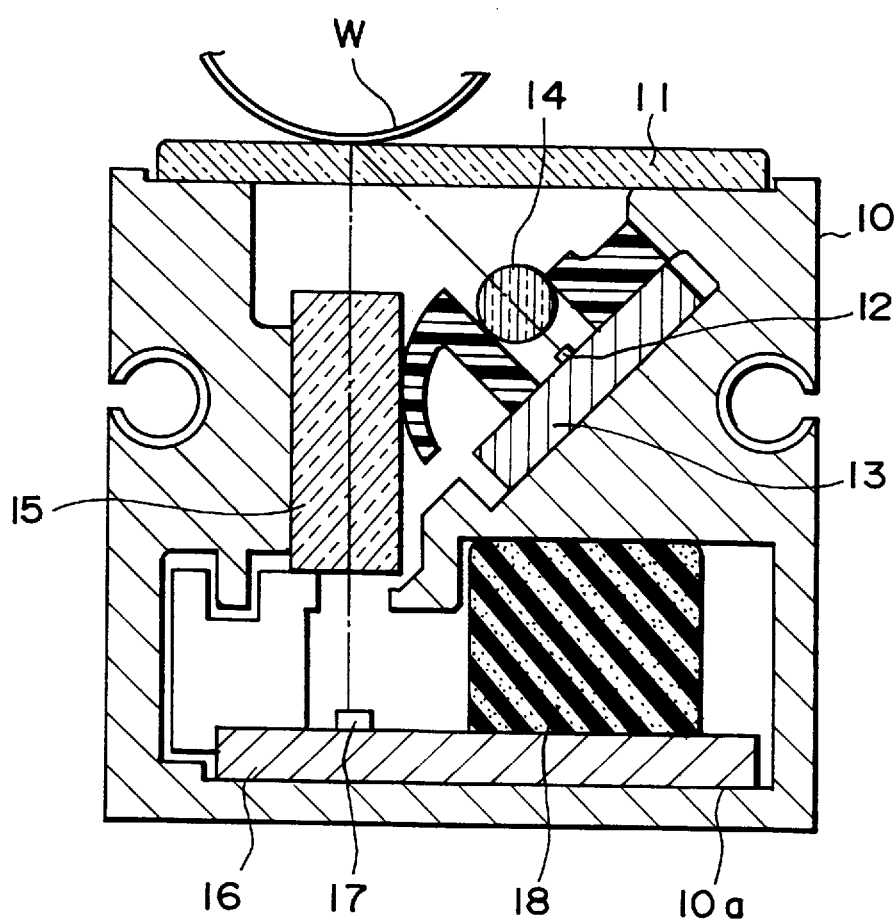
FIG. 1 is a sectional view of the main part of a conventional image sensor.
Figure 2:
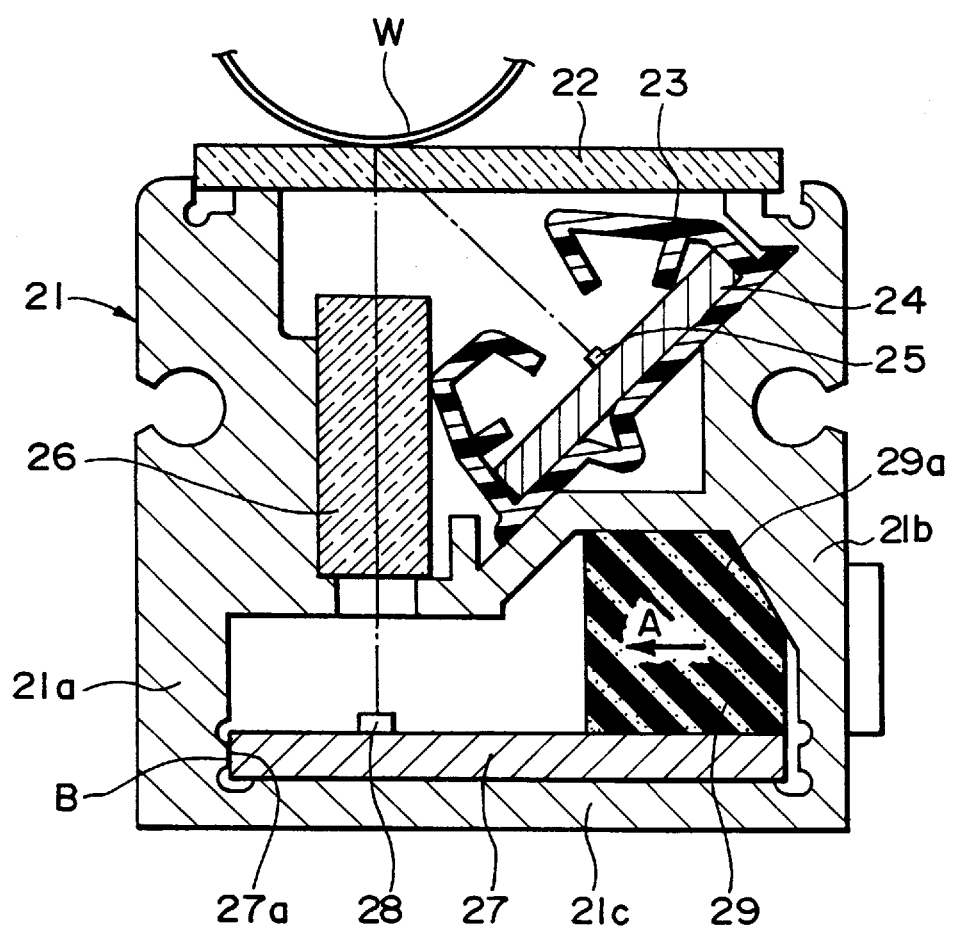
FIG. 2 is a sectional view of the main part of an embodiment of an image sensor according to the present invention.

An image sensor according to the present invention will now be explained with reference to preferred embodiments. A first embodiment of an image sensor according to the present invention is shown in FIG. 2. In this embodiment, a glass cover (transparent cover) 22 is attached to the upper opening portion of a frame 21 having an approximately rectangular shape as viewed sideways in such a manner as to oppose the object W being photographed. A first substrate 24 supported by a supporting piece 23 is disposed slightly above the central portion of the frame 21 in such a manner as to be inclined at 45 degrees relative to the glass cover 22. A light emitting device 25 is mounted on the substrate 24. A rod lens array 26 as an optical system is provided in the optical path of the light which is emitted from the light emitting device 25 and reflected from the object W, namely, below the reflecting point in such a manner as to be perpendicular to the glass cover 22 and parallel to the side wall 21a of the frame 21. A second substrate 27 is disposed on thinner surface of the bottom 21c of the frame 21. A light receiving device 28 is mounted on the upper surface of the substrate 27, and a sponge piece 29 as an elastic member is secured to a vacant portion of the substrate 27 by an adhesive. The substrate 27 is composed of an insulating material, and the sponge piece 29 has a substantially rectangular section. The light receiving device 28 is mounted on the substrate 27 in such a manner as to be situated below the rod lens array 26.

Figure 3A:
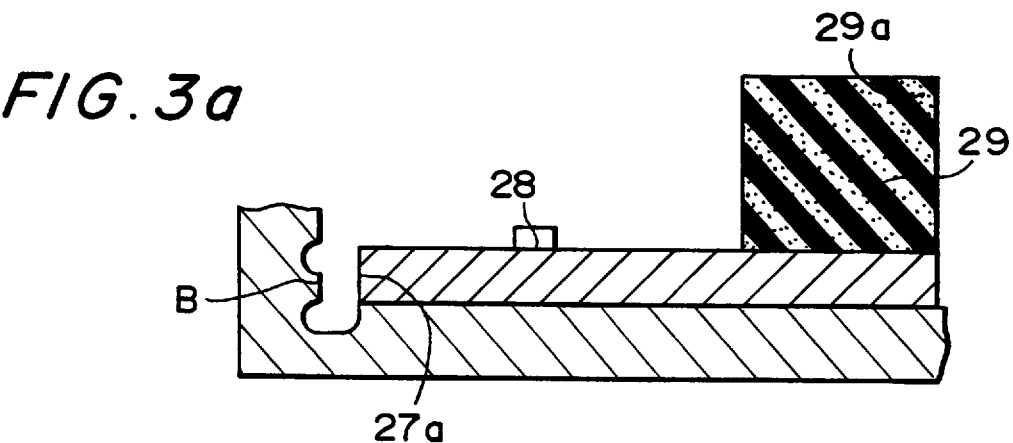
FIGS. 3a and 3b are explanatory views of the operation of the embodiment shown in FIG. 2.
Figure 3B:
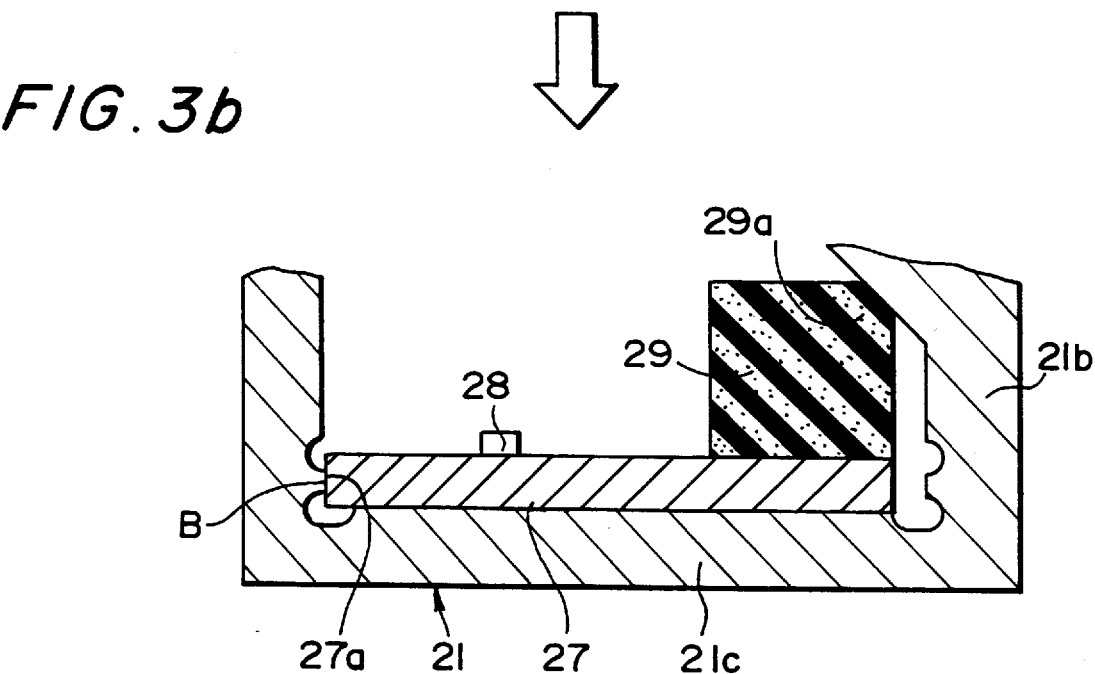

In assembling the image sensor, the substrate 27 is inserted from the side portion of the frame 21 and installed in the frame 21. In the state in which the sponge piece 29 is not brought into contact with the side wall 21b of the frame 21 while the substrate 27 is being inserted, there is a gap between the side wall 21a and the left end surface 27a of the substrate, as shown in FIG. 3(a). However, when the substrate 27 has been completely installed in the frame 21, the upper corner end 29a of the sponge piece 29 comes into contact with the inclined inner surface of the side wall 21b of the frame 21, as shown in FIG. 3(b). As a result, the elastic force of the sponge piece 29 urges the sponge piece 29 in the direction indicated by the arrow A, as shown in FIG. 2. The substrate 27 to which the sponge piece 29 is fixed also receives the force in the same direction, and the end surface 27a of the substrate 27 is brought into contact with a predetermined position B of the side wall 21a of the frame 21, as shown in FIG. 2. The substrate 27 is thus fixed at this position. This embodiment is so designed that the light receiving device 28 is situated directly under the rod lens array 26 when the substrate 27 is fixed at this position. It is therefore possible to constantly set the light receiving device at a predetermined position without any deviation in the horizontal direction. In addition, the upper surface of the sponge piece 29 is also in contact with the frame 21, so the substrate 27 is also fixed in the vertical direction. The sponge piece 29 need not be provided extending over the total length of the frame 21, and it may be provided at, for example, three portions (both ends and the central portion) of the substrate 27 at regular intervals in the longitudinal direction of the frame 21.

In this image sensor, the light emitted from the light emitting device 25 is projected onto the object (copy) W being photographed on the glass cover 11 at about 45 degrees relative to the glass cover 22. The light reflected from the copy W perpendicularly to the glass cover 22 passes through the rod lens array 26 and is received and converted into an electric signal by the light receiving device 28 which is situated directly under the rod lens array 26.

Figure 4:
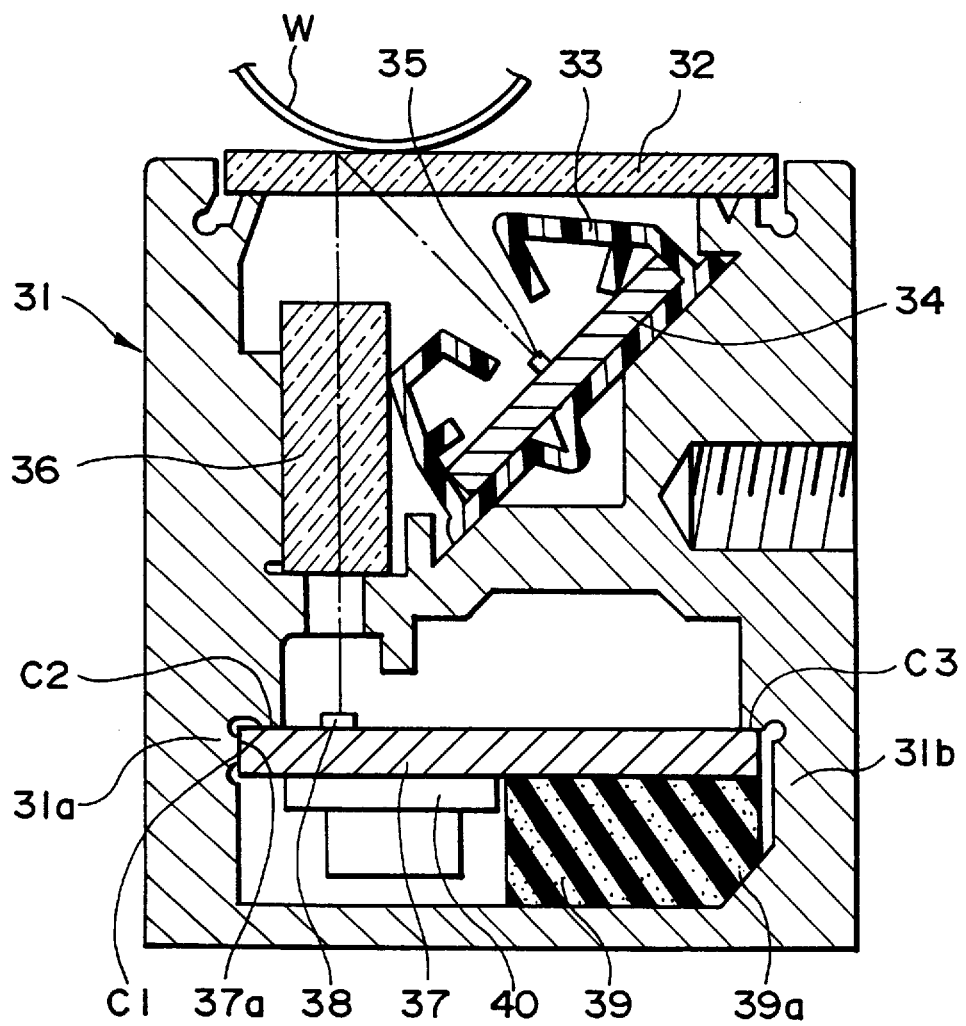
FIG. 4 is a sectional view of the main part of another embodiment of an image sensor according to the present invention.

FIG. 4 shows a second embodiment of an image sensor according to the present invention. In the same way as in the first embodiment, a glass cover 32 is attached to the upper opening portion of a frame 31, a substrate 34 with a light emitting device 35 attached thereto which is supported by a supporting piece 33 is disposed in the frame 31 in such a manner as to be inclined at 45 degrees relative to the glass cover 32, and a rod lens array 36 as an optical system is disposed in the frame 31 so as to be perpendicular to the glass cover 22.

In this embodiment, however, a light receiving device 38 and a connector 40 are attached to a substrate 37, and a sponge piece 39 as an elastic member is fixed to the under surface of the substrate 37 by an adhesive at the right-hand portion in FIG. 4. In assembling the image sensor, the lower corner end 39a of the sponge piece 39 comes into contact with the inclined inner surface of the side wall 31b of the frame 31. As a result, the elastic force of the sponge piece 39 urges the sponge piece 39 leftward. The substrate 37 to which the sponge piece 39 is attached also receives the force in the same direction, and the end surface 37a of the substrate 37 is brought into contact with a predetermined position C1 of the side wall 31a of the frame 31, as shown in FIG. 4. The substrate 37 is thus positioned in the horizontal direction. In addition, since the under surface of the sponge piece 39 is also in contact with the bottom surface of the frame 31, the substrate 37 is also urged upward and brought into contact with predetermined positions C2, C3. Thus, the substrate 37 is also positioned in the vertical direction. In this way, any deviation of the substrate 37 is prevented in the horizontal and the vertical directions.

This embodiment is so designed that the light receiving device 38 is situated directly under the rod lens array 36 in the same way as in the first embodiment. According to this embodiment, since the substrate 37 is pushed upward from below so that the upper surface of the substrate 37 comes into contact with the frame 31, the substrate 37 abuts the frame 31 at the upper surface of the substrate 37. It is therefore easy to adjust the focus of the rod lens array 36 on the light receiving device 38. The sponge piece 39 need not be provided extending over the total length of the frame 31. In this embodiment, as in the first embodiment, the light emitted from the light emitting device 35 is projected onto the copy W, and the light reflected from the copy W perpendicularly to the glass cover 32 passes through the rod lens array 36, and is received and converted into an electric signal by the light receiving device 38 which is situated directly under the rod lens array 36.

Figure 5:
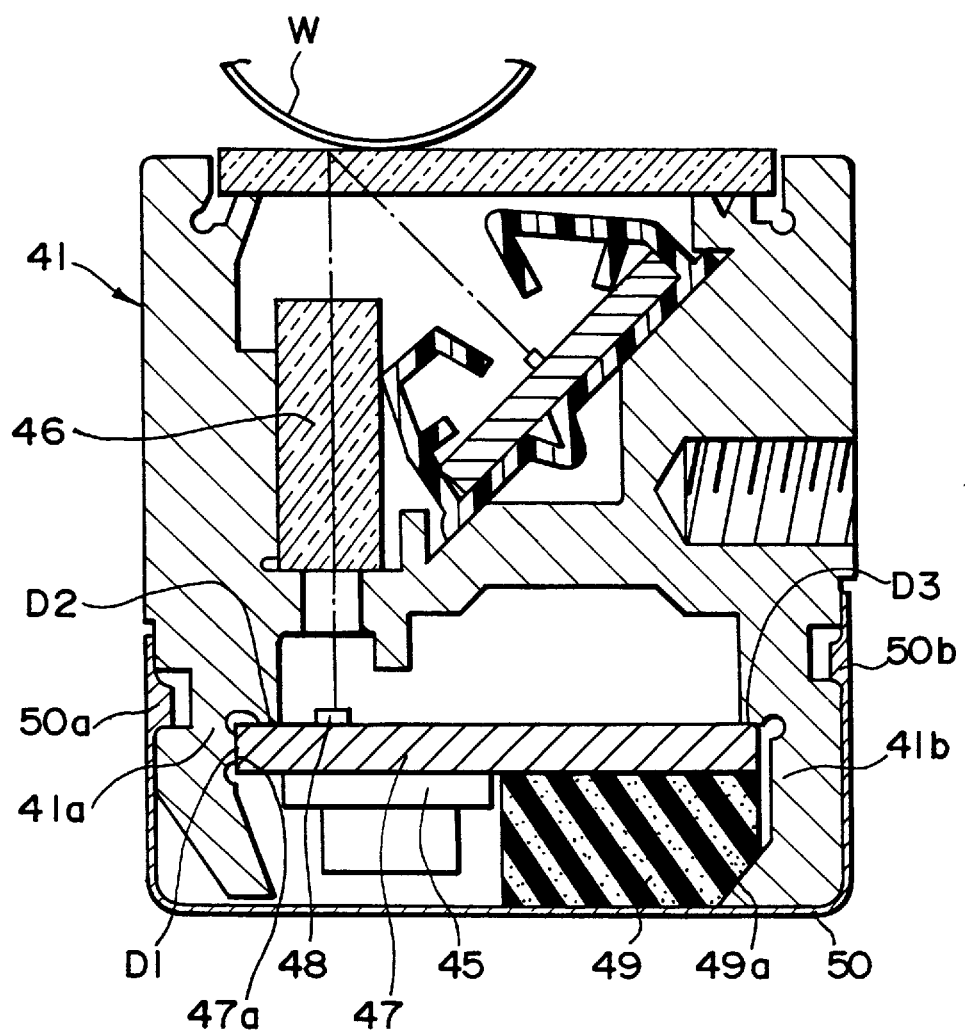
FIG. 5 is a sectional view of the main part of still another embodiment of an image sensor according to the present invention.

FIG. 5 shows a third embodiment of an image sensor according to the present invention. This embodiment has approximately the same structure as that of the second embodiment. A light receiving device 48 is attached to a substrate 47, and a sponge piece 49 as an elastic member is fixed to the under surface of the substrate 47 by an adhesive at the right-hand portion in FIG. 5. In this embodiment, however, a frame 41 is fitted into a bottom case 50 having a U-shaped section and is removably engaged therewith at projections 50a, 50b. It is therefore easy to mount the substrate 47 on the frame 41. When the substrate 47 having the sponge piece 49 is mounted on the frame 41, the sponge piece 49 is urged leftward and upward by an inclined inner surface 49a of the frame 41. Consequently, the end surface 47a of the substrate 47 is brought into contact with a predetermined position D1 of the inner surface of the side wall 41a of the frame 41, and the upper surface of the substrate 47 is brought into contact with predetermined positions D2, D3 of the upper surface of the substrate 47. Thus, the substrate 47 is positioned both in the horizontal direction and in the vertical direction, thereby preventing any deviation of the substrate 37.

Figure 6:
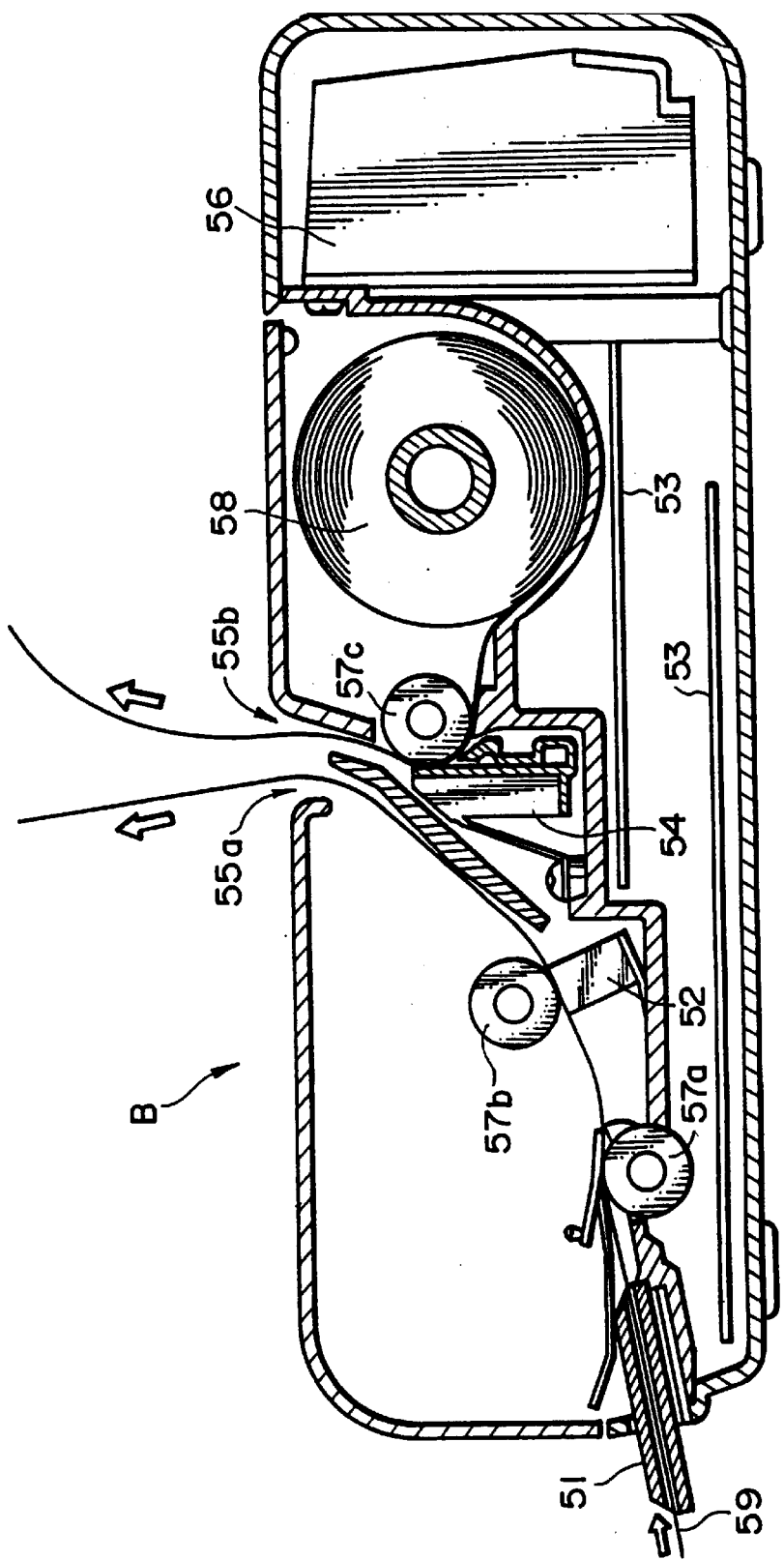
FIG. 6 is a sectional view of the main part of a facsimile apparatus with an image sensor according to the present invention mounted thereon.

FIG. 6 shows the internal structure of a facsimile machine with an image sensor having the above-described structure mounted therein.

A facsimile machine B comprises a copy supplying portion 51, an image sensor 52 as an image reader, substrates 53 having a control portion for controlling the operation of the facsimile machine as a whole including transmission/reception, a printing portion 54, a copy discharging portion 55a, 55b and a power source 56.

The operation of the facsimile machine B will now be explained. When a copy 59 is supplied from the copy supplying portion 51, the copy 59 is transferred by platen rollers 57a, 57b. The image sensor 52 reads the image of the copy 59 and outputs the image information to the control portion in the form of an electric signal. The electric signal input to the control portion is transmitted to an external machine through a telephone line or the like. After the image of the copy 59 is read, the copy 59 is discharged from a copy discharging portion 55a.

When the control portion receives the signal transmitted from an external machine, the control portion so controls the printing portion 54 as to print the transmitted image on printing paper 58. The printed paper 58 is discharged from a copy discharging portion 55b by a platen roller 57c.

By using the image sensor of the present invention as the image sensor 52 of the facsimile machine B having the above-described structure, it is possible to obtain a good picture quality.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An image sensor for projecting light onto the surface of a document converting the light reflected from said document into an electric signal and thus reading the information of said document, said image sensor comprising:

(a) a frame having an inclined inner surface;

(b) a light emitting device provided within said frame so as to project light onto the surface of said document;

(c) a light receiving device provided within said frame so as to receive the light reflected from said document;

(d) an optical system provided within said frame so as to introduce said light reflected from said document to said light receiving device;

(e) a substrate to which said light receiving device is attached and which is provided within said frame; and, (f) an elastic member which is attached to the upper surface of said substrate in such a manner that, when said substrate is mounted on said frame, at least a part of the upper surface of said elastic member comes into contact with said frame and at least a part of the side surface of said elastic member comes into contact with said inclined inner surface of said frame so as to push said substrate downward and in the horizontal direction.

2. An image sensor according to claim 1, wherein said elastic member is a sponge piece.

3. The image sensor of claim 2 positioned within a facsimile apparatus.

4. The image sensor of claim 1 positioned within a facsimile apparatus.

5. An image sensor for projecting light onto the surface of a document, converting the light reflected from said document into an electrical signal and thus reading the information of said document, said image sensor comprising:

(a) a frame having an inclined inner surface;

(b) a light emitting device provided within said frame so as to project light onto the surface of said document;

(c) a light receiving device provided within said frame so as to receive the light reflected from said document;

(d) an optical system provided within said frame so as to introduce said light reflected from said document to said light receiving device;

(e) a substrate to which said light receiving device is attached and which is provided within said frame; and (f) an elastic member which is attached to the under surface of said substrate in such a manner that, when said substrate is mounted within said frame, at least a part of the under surface of said elastic member comes into contact with the bottom portion of said frame and at least a part of the side surface of said elastic member comes into contact with said inclined inner surface of said frame so as to push said substrate upward and in the horizontal direction.

6. An image sensor according to claim 5, wherein said elastic member is a sponge piece.

7. The image sensor of claim 6 positioned within a facsimile apparatus.

8. The image sensor of claim 5 positioned within a facsimile apparatus.

9. An image sensor for projecting light onto the surface of a document, converting the light reflected from said document into an electric signal and thus reading the information of said document, said image sensor comprising:

(a) a frame having an inclined inner surface;

(b) a bottom plate which is engaged with said frame so as to cover a surface of said frame;

(c) a light emitting device provided within said frame so as to project light onto the surface of said document;

(d) a light receiving device provided within said frame so as to receive the light reflected from said document;

(e) an optical system provided within said frame so as to introduce said light reflected from said document to said light receiving device;

(f) a substrate to which said light receiving device is attached and which is provided within said frame; and (g) an elastic member which is attached to the under surface of said substrate in such a manner that, when said substrate is mounted within said frame, at least a part of the under surface of said elastic member comes into contact with said bottom plate and at least a part of the side surface of said elastic member comes into contact with said inclined inner surface of said frame so as to push said substrate upward and in the horizontal direction.

10. An image sensor according to claim 9, wherein said elastic member is a sponge piece.

11. The image sensor of claim 10 positioned within a facsimile apparatus.

12. The image sensor of claim 9 positioned within a facsimile apparatus.

* * * * *